United States Patent
Tu et al.

(10) Patent No.: US 12,550,901 B2
(45) Date of Patent: Feb. 17, 2026

(54) COMPOSITIONS CONTAINING GLUFOSINATE AND A SYNTHETIC AUXIN HERBICIDE

(71) Applicant: Dow AgroSciences LLC, Indianapolis, IN (US)

(72) Inventors: Fuquan Tu, Zionsville, IN (US); Mei Li, Westfield, IN (US)

(73) Assignee: CORTEVA AGRISCIENCE LLC, Indianapolis, IN (US)

( * ) Notice: Subject to any disclaimer, the term of this patent is extended or adjusted under 35 U.S.C. 154(b) by 721 days.

(21) Appl. No.: 17/051,201

(22) PCT Filed: Apr. 26, 2019

(86) PCT No.: PCT/US2019/029306
§ 371 (c)(1),
(2) Date: Oct. 28, 2020

(87) PCT Pub. No.: WO2019/212888
PCT Pub. Date: Nov. 7, 2019

(65) Prior Publication Data
US 2021/0045389 A1    Feb. 18, 2021

Related U.S. Application Data

(60) Provisional application No. 62/665,812, filed on May 2, 2018.

(51) Int. Cl.
| | | |
|---|---|---|
| *A01N 57/20* | (2006.01) | |
| *A01N 25/30* | (2006.01) | |
| *A01N 37/38* | (2006.01) | |
| *A01N 37/40* | (2006.01) | |

(52) U.S. Cl.
CPC ............ *A01N 57/20* (2013.01); *A01N 25/30* (2013.01); *A01N 37/38* (2013.01); *A01N 37/40* (2013.01)

(58) Field of Classification Search
CPC ........ A01N 57/20; A01N 25/30; A01N 37/18; A01N 37/40; A01N 43/40; A01N 37/38
See application file for complete search history.

(56) References Cited

U.S. PATENT DOCUMENTS

| | | | | |
|---|---|---|---|---|
| 2011/0143938 A1* | 6/2011 | Fowler | ................ | A01N 43/40 504/136 |
| 2011/0257012 A1* | 10/2011 | Stagg | .................. | A01N 33/12 504/254 |
| 2015/0157022 A1 | 6/2015 | Mann et al. | | |
| 2015/0359230 A1* | 12/2015 | Messina | ............... | A01N 65/40 424/731 |
| 2016/0205926 A1* | 7/2016 | Downer | ............... | A01N 37/40 |
| 2017/0210691 A1 | 7/2017 | Liu et al. | | |
| 2017/0265477 A1 | 9/2017 | Baur et al. | | |
| 2019/0014776 A1* | 1/2019 | Hemminghaus | ...... | A01N 25/22 |
| 2019/0110469 A1* | 4/2019 | Long | .................... | A01N 57/20 |

FOREIGN PATENT DOCUMENTS

| | | |
|---|---|---|
| CN | 102 027 992 A | 4/2011 |
| CN | 106 995 460 A | 8/2017 |
| CN | 107 711 878 A | 2/2018 |

OTHER PUBLICATIONS

GSRS: sodium laureth-3 sulfate, 3 pages.*
Andreas Haas: "Safety Data Sheet Ignite 280 SL", Jun. 23, 2016 (Jun. 23, 2016), pp. 1-11, XP55600067. Retrieved from the Internet: URL: https://assets.greenbook.net/12-56-45-12-03-2018-Ignite_280_SL1e_Herbicide_MSDS.pdf [Retrieved on Jun. 27, 2019], p. 2, paragraph 3; p. 6, paragraph 9.
International Search Report, PCT/US2019/029306, Jul. 11, 2019, Dow AgroSciences LLC.
Bayer: "Ignite 280 SL Herbicide," Safety Data Sheet, 2016, 11 Pages.
International Preliminary Report on Patentability for International Application No. PCT/US2019/029306, mailed Nov. 12, 2020, 09 Pages.

* cited by examiner

*Primary Examiner* — Kyle A Purdy

(57) ABSTRACT

Aqueous herbicide compositions containing a salt of glufosinate and a salt of a synthetic auxin herbicide are described. Such compositions exhibit good compatibility and reduced viscosity. Methods of reducing the viscosity of an aqueous herbicide composition are also disclosed.

11 Claims, No Drawings

COMPOSITIONS CONTAINING GLUFOSINATE AND A SYNTHETIC AUXIN HERBICIDE

This application claims priority to International (PCT) Patent Application Serial No. PCT/US2019/29306, filed Apr. 26, 2019, and entitled "COMPOSITIONS CONTAINING GLUFOSINATE AND A SYNTHETIC AUXIN HERBICIDE," which claims priority to provisional application 62/665,812 which was filed in the U.S. Patent and Trademark Office on May 2, 2018, the entire disclosure of which is hereby incorporated by reference.

FIELD

This disclosure relates to compositions containing glufosinate and a synthetic auxin herbicide, and methods of reducing the viscosity of an aqueous herbicide solution.

BACKGROUND

Compositions containing herbicidal and plant growth modifying chemicals are widely used in agricultural, industrial, recreational, and residential areas worldwide. The active ingredients of such compositions are frequently synthetic auxin herbicides, more particularly their salts. These herbicide salts generally have high water solubility leading to their use in high strength aqueous concentrates intended for dilution in water prior to application by spraying or other means.

Herbicides such as the synthetic auxin herbicides, e.g., 2,4-dichlorophenoxyacetic acid (2,4-D) and 3,6-dichloro-2-methoxybenzoic acid (dicamba), have long been used to control unwanted vegetation. 2,4-D and dicamba are normally provided in liquid formulations as water soluble amine salts. In certain circumstances, however, these chemical forms of 2,4-D or dicamba suffer from problems such as incompatibility with other herbicides, such as the broad spectrum herbicides glyphosate and/or glufosinate. Additionally, an aqueous liquid herbicide composition containing a high concentration of a water soluble salt of a herbicide, such as a water-soluble salt of glufosinate, may have an unacceptably high viscosity. Such a high-viscosity aqueous liquid herbicide composition can be difficult for the end user to handle under typical usage, such as pouring, diluting, mixing, and spraying the aqueous liquid herbicide composition.

Therefore, there is a need for new herbicide products that offer improved performance, stability, compatibility, and flexibility to the end user. These improvements may include improvements to the physical properties of the new herbicide products. For example, aqueous herbicide compositions having improved or reduced viscosity may be easier for the end user to handle under typical usage with conventional agricultural equipment.

SUMMARY

Disclosed herein are aqueous herbicide compositions containing a water soluble salt of glufosinate and a water soluble salt of a synthetic auxin herbicide. Such compositions exhibit good compatibility and, surprisingly, also exhibit reduced viscosity.

In some aspects, the aqueous herbicide composition may include: (a) from about 1 to about 25 weight percent on an acid equivalent basis (wt % ae) of a water soluble salt of glufosinate; (b) from about 1 to about 25 wt % ae of a water soluble salt of a synthetic auxin herbicide; and (c) from about 1 to about 25 weight percent (wt %) of one or more surfactants, wherein the composition exhibits a reduction in viscosity between about 40% to about 90% at a temperature between 15° C. to 25° C. when compared to a similar composition where the synthetic auxin herbicide salt is omitted.

In various aspects, the water soluble salt of glufosinate is derived by neutralizing glufosinate acid with an organic amine compound of Formula (I):

wherein:
R$^1$, R$^2$, and R$^3$ are each independently [(C$_n$H$_{2n}$)O]$_m$R$^5$;
R$^4$=[(C$_n$H$_{2n}$)O]$_m$R$^{5'}$;
R$^5$=H, OH or C$_1$-C$_6$ alkyl;
R$^{5'}$=(CH$_2$)$_n$;
X=R$^6$ or R$^7$NR$^8$R$^9$, where R$^6$, R$^8$, and R$^9$ are each independently [(C$_n$H$_{2n}$)O]$_m$R$^5$.
R$^7$=[(C$_n$H$_{2n}$)O]$_m$R$^{5'}$; and
n=1-4; m=0-10; z=0-3.

The organic amine compound is not particularly limited. In various aspects, the organic amine compound is selected from the group consisting of monomethylamine, dimethylamine, triethylamine, propylamine, dipropylamine, tripropylamine, isopropylamine, diisopropylamine, triisopropylamine, n-butylamine, dibutylamine, tributylamine, sec-butylamine, isobutylamine, t-butylamine, methylethylamine, dimethylethylamine, methyldiethylamine, methyl-n-propylamine, ethyl-n-propylamine, methylethyl-n-propylamine, ethylenediamine, diethylenetriamine (CAS #111-40-0), triethylenetetramine (CAS #112-24-3), tetraethylenepentamine (CAS #112-57-2), ethanolamine, diethanolamine, triethanolamine, propanolamine, dipropanolamine, tripropanolamine, isopropanolamine, diisopropanolamine, triisopropanolamine, butanolamine, dibutanolamine, tributanolamine, isobutanolamine, dimethylethanolamine, diethyleneglycol amine (diglycolamine), triethyleneglycol amine, N-methyldiethanolamine, diethylethanolamine, N-ethyldiethanol-amine, N-(2-hydroxyethyl)ethylenediamine, N,N-bis-(2-aminoethyl)methylamine, N,N-bis-(3-aminopropyl)methylamine, aminoethylethanolamine (CAS #111-41-1), N,N,N',N'-tetraethyldiethylenetriamine (CAS #123-12-6), N,N'-bis-(3-aminopropyl)-1,3-propanediamine (CAS #4605-14-5), N,N-bis[3-(methylamino)propyl]methylamine (CAS #123-70-6), and combinations thereof.

In various aspects, the water soluble salt of glufosinate is derived by neutralizing glufosinate acid with a cation selected from the group consisting of Li$^+$, Na$^+$, K$^+$, NH$_4^+$, and a quaternary organic ammonium cation of Formula II

wherein $R^1$, $R^2$, $R^3$, and $R^4$ independently are linear or branched ($C_1$-$C_{16}$) alkyl, ($C_1$-$C_{16}$) arylalkyl, or ($CH_2CH_2O)_m$H, and n is an integer from 1-3.

The quaternary organic ammonium cation is not particularly limited. In various aspects, the quaternary organic ammonium cation is selected from the group consisting of tetramethyl ammonium cation, tetraethyl ammonium cation, tetrapropyl ammonium cation, tetrabutyl ammonium cation, trimethylethyl ammonium cation, dimethyldiethyl ammonium cation, methyltriethyl ammonium cation, N-benzyltrimethyl ammonium cation, N-hexadecyltrimethylammonium cation, choline cation ((e.g., 2-hydroxyethyl)trimethyl ammonium), and combinations thereof.

In some aspects, the synthetic auxin herbicide may be 2,4-D, aminopyralid, clopyralid, dicamba, fluroxypyr, MCPA, MCPB, mecoprop, mecoprop-P, triclopyr, or combinations thereof. For example, the synthetic auxin herbicide may be 2,4-D, dicamba, or a combination of 2,4-D and dicamba.

In some aspects, the water soluble salt of the synthetic auxin herbicide is derived by neutralizing the synthetic auxin herbicide acid with an organic amine compound of Formula (I):

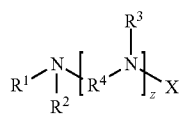

(I)

wherein:
$R^1$, $R^2$, and $R^3$ are each independently $[(C_nH_{2n})O]_mR^5$;
$R^4=[(C_nH_{2n})O]_mR^{5'}$;
$R^5=$H, OH or $C_1$-$C_6$ alkyl;
$R^{5'}=(CH_2)_n$;
X=$R^6$ or $R^7NR^8R^9$, where $R^6$, $R^8$, and $R^9$ are each independently $[(C_nH_{2n})O]_mR^5$.
$R^7=[(C_nH_{2n})O]_mR^{5'}$; and
n=1-4; m=0-10; z=0-3.

The organic amine compound is not particularly limited. In various aspects, the organic amine compound is selected from the group consisting of monomethylamine, dimethylamine, triethylamine, propylamine, dipropylamine, tripropylamine, isopropylamine, diisopropylamine, triisopropylamine, n-butylamine, dibutylamine, tributylamine, sec-butylamine, isobutylamine, t-butylamine, methylethylamine, dimethylethylamine, methyldiethylamine, methyl-n-propylamine, ethyl-n-propylamine, methylethyl-n-propylamine, ethylenediamine, diethylenetriamine (CAS #111-40-0), triethylenetetramine (CAS #112-24-3), tetraethylenepentamine (CAS #112-57-2), ethanolamine, diethanolamine, triethanolamine, propanolamine, dipropanolamine, tripropanolamine, isopropanolamine, diisopropanolamine, triisopropanolamine, butanolamine, dibutanolamine, tributanolamine, isobutanolamine, dimethylethanolamine, diethyleneglycol amine (diglycolamine), triethyleneglycol amine, N-methyldiethanolamine, diethylethanolamine, N-ethyldiethanol-amine, N-(2-hydroxyethyl)ethylenediamine, N,N-bis-(2-aminoethyl)methylamine, N,N-bis-(3-aminopropyl)methylamine, aminoethylethanolamine (CAS #111-41-1), N,N,N',N'-tetraethyldiethylenetriamine (CAS #123-12-6), N,N'-bis-(3-aminopropyl)-1,3-propanediamine (CAS #4605-14-5), N,N-bis[3-(methylamino)propyl]methylamine (CAS #123-70-6), and combinations thereof.

In various aspects, the water soluble salt of the synthetic auxin herbicide is derived by neutralizing the synthetic auxin herbicide acid with a cation selected from the group consisting of $Li^+$, $Na^+$, $K^+$, $NH_4^+$, and a quaternary organic ammonium cation of Formula (II):

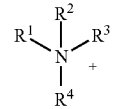

(II)

wherein $R^1$, $R^2$, $R^3$, and $R^4$ independently are linear or branched ($C_1$-$C_{16}$) alkyl, ($C_1$-$C_{16}$) arylalkyl, or ($CH_2CH_2O)_n$H, and n is an integer from 1-3.

The quaternary organic ammonium cation is not particularly limited. In various aspects, the quaternary organic ammonium cation is selected from the group consisting of tetramethyl ammonium cation, tetraethyl ammonium cation, tetrapropyl ammonium cation, tetrabutyl ammonium cation, trimethylethyl ammonium cation, dimethyldiethyl ammonium cation, methyltriethyl ammonium cation, N-benzyltrimethyl ammonium cation, N-hexadecyltrimethylammonium cation, choline cation, and combinations thereof.

The surfactants are not particularly limited and may include an anionic surfactant, a cationic surfactant, a nonionic surfactant, or a mixture of the aforementioned surfactants.

In some aspects, the surfactant is an anionic surfactant selected from various ether sulfates, such as a sodium lauryl ether sulfate or an isopropyl ammonium lauryl ether sulfate, or combinations thereof. The anionic surfactant may also be selected from a surfactant of Formula (III):

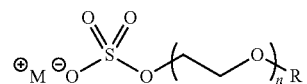

(III)

wherein: (a) M is Na, K, $NH_4$, or an alkyl ammonium selected from the group consisting of methyl, ethyl, propyl, and isopropyl ammonium; (b) n is an integer from 1 to 10; and (c) R is a saturated or unsaturated $C_6$-$C_{18}$ linear or branched alkyl group. In some aspects, M is Na or isopropyl ammonium, n is an integer from 1-3, and R is a saturated linear alkyl group (e.g., a $C_{12}$ linear alkyl group).

In some aspects, the aqueous liquid herbicide composition disclosed herein may also include one or more agriculturally acceptable adjuvants or carriers. In some aspects, the composition may be in the form of an aqueous liquid concentrate intended for dilution with water or a solvent before final use. In some aspects, the composition may be in the form of a ready-to-use aqueous spray solution or mixture. In some aspects, the composition may be mixed with at least one additional pesticide. In some aspects, the at least one additional pesticide may be a fungicide, a herbicide, an insecticide, or a combination thereof (e.g., a herbicide and a fungicide).

Methods of preparing the aqueous herbicide composition may include combining water-soluble salt of glufosinate, a water-soluble salt of a synthetic auxin herbicide, a surfactant, and water.

Methods of controlling undesirable vegetation may include applying the aqueous herbicide composition to the undesirable vegetation or to the locus of the undesirable vegetation after emergence of the undesirable vegetation, or to the soil to prevent the emergence of the undesirable vegetation.

In some aspects, an aqueous herbicide composition may include: (a) from about 1 to about 25 wt % ae of an ammonium salt of glufosinate; (b) from about 1 to about 25 wt % ae of an ammonium salt of a synthetic auxin herbicide; and (c) from about 1 to about 25 wt % of a surfactant. The ammonium salt of glufosinate and the ammonium salt of the synthetic auxin herbicide are independently derived by neutralizing the glufosinate acid or the synthetic auxin herbicide acid with:

(i) an organic amine compound of Formula (I)

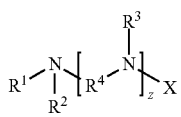

(I)

wherein:
$R^1$, $R^2$, and $R^3$ are each independently $[(C_nH_{2n})O]_mR^5$;
$R^4=[(C_nH_{2n})O]_mR^{5'}$;
$R^5$=H, OH or $C_1$-$C_6$ alkyl;
$R^{5'}=(CH_2)_n$;
X=$R^6$ or $R^7NR^8R^9$, where $R^6$, $R^8$, and $R^9$ are each independently $[(C_nH_{2n})O]_mR^5$;
$R^7=[(C_nH_{2n})O]_mR^5$; and
n=1-4; m=0-10; z=0-3;
or:
(ii) a quaternary organic ammonium cation of Formula (II):

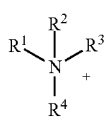

(II)

wherein $R^1$, $R^2$, $R^3$, and $R^4$ independently are linear or branched ($C_1$-$C_{16}$) alkyl, ($C_1$-$C_{16}$) arylalkyl, or $(CH_2CH_2O)_nH$, and n is an integer from 1-3.

This aqueous herbicide composition exhibits a reduction in viscosity between about 50% to about 80% at a temperature of about 0° C. when compared to a similar composition where the synthetic auxin herbicide salt is omitted.

In some aspects, a method of reducing the viscosity of an aqueous herbicide composition may include providing an aqueous solution comprising an ammonium salt of glufosinate and a surfactant, and adding to the aqueous solution an ammonium salt of a synthetic auxin herbicide to form a reduced viscosity aqueous mixture. The reduced viscosity aqueous mixture comprises: (a) from about 1 to about 25 wt % ae of the ammonium salt of glufosinate; (b) from about 1 to about 25 wt % ae of the ammonium salt of the synthetic auxin herbicide; and (c) from about 1 to about 25 wt % of the surfactant. The ammonium salt of glufosinate and the ammonium salt of the synthetic auxin herbicide are independently derived by neutralizing the glufosinate acid or the synthetic auxin herbicide acid with:

(i) an organic amine compound of Formula (I):

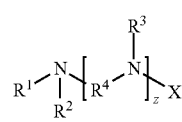

(I)

wherein:
$R^1$, $R^2$, and $R^3$ are each independently $[(C_nH_{2n})O]_mR^5$;
$R^4=[(C_nH_{2n})O]_mR^{5'}$;
$R^5$=H, OH or $C_1$-$C_6$ alkyl;
$R^{5'}=(CH_2)_n$;
X=$R^6$ or $R^7NR^8R^9$, where $R^6$, $R^8$, and $R^9$ are each independently $[(C_nH_{2n})O]_mR^5$;
$R^7=[(C_nH_{2n})O]_mR^5$; and
n=1-4; m=0-10; z=0-3;
or:
(ii) a quaternary organic ammonium cation of Formula (II):

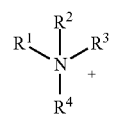

(II)

wherein $R^1$, $R^2$, $R^3$, and $R^4$ independently are linear or branched ($C_1$-$C_{16}$) alkyl, ($C_1$-$C_{16}$) arylalkyl, or $(CH_2CH_2O)_nH$, and n is an integer from 1-3.

The aqueous herbicide composition exhibits a reduction in viscosity between about 40% to about 90% at a temperature between 15° C. to 25° C. when compared to a similar composition where the synthetic auxin herbicide salt is omitted.

DETAILED DESCRIPTION

As briefly described above, there is a need for new herbicide products that have improved or reduced viscosity, which can improve the flowability and/or handling when used. The disclosed compositions and methods offer such a solution.

Terms used herein will have their customary meaning in the art unless specified otherwise. The singular forms "a," and "the" include plural references unless stated otherwise. The present disclosure also contemplates other embodiments "comprising," "consisting of" and "consisting essentially of," the embodiments or elements presented herein, whether explicitly set forth or not. To the extent that the term "or" is employed (e.g., A or B) it is intended to mean "A or B or both." If this disclosure intends to indicate "only A or B but not both" then the term "only A or B but not both" will be employed. Thus, use of the term "or" herein is the inclusive and not the exclusive use.

The chemical moieties mentioned when defining variable positions within the general formulae described herein (e.g., the term "alkyl") are collective terms for the individual substituents encompassed by the chemical moiety. The prefix $C_n$-$C_m$ preceding a group or moiety indicates, in each case, the possible number of carbon atoms in the group or moiety that follows.

As used herein, the terms "herbicide" and "herbicidal active ingredient" may be understood to include an active ingredient that kills, controls, or otherwise adversely modifies the growth of vegetation, particularly undesirable vegetation such as weed species, when applied in an appropriate amount.

As used herein, the term "herbicidal effect" may be understood to include an adversely modifying effect of an active ingredient on vegetation, including, for example, a deviation from natural growth or development, killing, regulation, desiccation, growth inhibition, growth reduction, and retardation. The term "herbicidal activity" refers generally to herbicidal effects of an active ingredient. As used herein, the term "prevents" or similar terms such as "preventing" may be understood by a person of ordinary skill to include any combination that shows herbicidal effect or reduces the competitive capability of the weed with respect to a crop.

As used herein, "applying" a herbicide or herbicidal composition may be understood to include delivering it directly to the targeted vegetation or to the locus thereof or to the area where control of undesirable vegetation is desired. Methods of application include, but are not limited to, pre-emergently contacting soil or water, post-emergently contacting the undesirable vegetation, or contacting the area adjacent to the undesirable vegetation.

As used herein, the term "vegetation" may be understood to include, for instance, dormant seeds, germinating seeds, emerging seedlings, plants propagating from vegetative propagules, immature vegetation, and established vegetation.

As used herein, the term "crop" may be understood to include desired vegetation, for instance, plants that are grown to provide food, shelter, pasture, erosion control, etc. Example crops include cereals, legumes, vegetables, orchard and timber trees, grapevines, etc. Preferably, herbicides or herbicidal compositions have zero or minimal herbicidal effect on crops.

As used herein, the term "undesirable vegetation" may be understood to include vegetation that is not wanted in a given area, for instance, weed species. Herbicides or herbicidal compositions are used to control undesirable vegetation. Preferably, herbicides or herbicidal compositions have a large or complete herbicidal effect on undesirable vegetation.

As used herein, "active ingredient" or "ai" may be understood to include a chemical compound or composition that has an effect on vegetation, for example, a herbicidal effect or a safening effect on the vegetation.

As used herein, "acid equivalent" or "ae" may be understood to include the amount of the acid form of an active ingredient that is calculated from the amount of a salt or ester form of that active ingredient. For example, if the acid form of an active ingredient "Z" has a molecular weight of 100 Dalton, and the salt form of Z has a molecular weight of 130 Dalton, an application of 130 g ai/ha of the Z salt would be equal to applying 100 g ae/ha of the acid form of Z:

130 g ai/ha Z salt*(100 Da Z acid/130 Da Z salt)
=100 g ae/ha Z acid.

Unless specifically limited otherwise, the term "alkyl", as well as derivative terms such as "arylalkyl", as used herein, may be understood to include straight chain, branched chain and cyclic moieties. Unless specifically stated otherwise, each may be unsubstituted or substituted with one or more substituents selected from but not limited to halogen, hydroxy, alkoxy or alkylthio, provided that the substituents are sterically compatible and the rules of chemical bonding and strain energy are satisfied.

As used herein, the term "aryl," as well as derivative terms such as aryloxy, may be understood to include groups that include a monovalent aromatic carbocyclic group of from 6 to 14 carbon atoms. Aryl groups can include a single ring or multiple condensed rings. In some aspects, aryl groups include $C_6$-$C_{10}$ aryl groups. Examples of aryl groups include, but are not limited to, phenyl, benzyl, biphenyl, naphthyl, tetrahydronaphthyl, and phenylcyclopropyl. In some aspects, the aryl group can be a phenyl, benzyl, or naphthyl group.

Aqueous herbicide compositions containing a water soluble salt of glufosinate, a water soluble salt of a synthetic auxin herbicide, and a surfactant, as well as methods for the preparation and use of such aqueous herbicide compositions are described herein. These compositions can be provided in admixture with agriculturally acceptable adjuvants and/or carriers, and in mixtures with other pesticides.

I. GLUFOSINATE SALTS

Glufosinate is a broad spectrum herbicide that is used to control important weeds such as morning glories, hemp sesbania (*Sesbania bispinosa*), Pennsylvania smartweed (*Polygonum pensylvanicum*) and yellow nutsedge. It is applied to young plants during early development for full effectiveness. Glufosinate may be provided in the form of a glufosinate acid, with the chemical structure (IV):

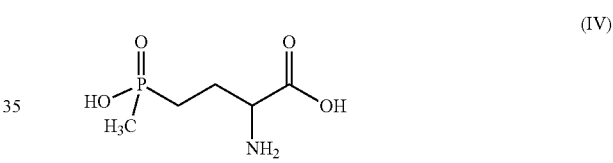

Glufosinate acid may be neutralized with another compound to form a glufosinate salt having the general chemical structure (V):

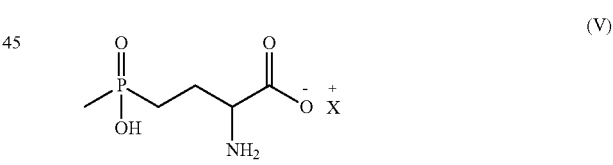

One exemplary glufosinate salt is glufosinate ammonium, where $X^+$ is $NH_4^+$. Glufosinate ammonium is sold in formulations under brand names including Basta™, Rely™, Finale™, Challenge™, and Liberty™.

In various aspects, the water soluble salt of glufosinate is derived by neutralizing glufosinate acid with an organic amine compound of Formula (I):

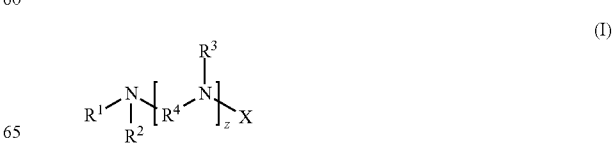

wherein:

R$^1$, R$^2$, and R$^3$ are each independently [(C$_n$H$_{2n}$)O]$_m$R$^5$;

R$^4$=[(C$_n$H$_{2n}$)O]$_m$R$^{5'}$;

R$^5$=H, OH or C$_1$-C$_6$ alkyl;

R$^{5'}$=(CH$_2$)$_n$;

X=R$^6$ or R$^7$NR$^8$R$^9$, where R$^6$, R$^8$, and R$^9$ are each independently [(C$_n$H$_{2n}$)O]$_m$R$^5$.

R$^7$=[(C$_n$H$_{2n}$)O]$_m$R$^{5'}$; and n=1-4; m=0-10; z=0-3.

The organic amine compound is not particularly limited. In various aspects, the organic amine compound is selected from the group consisting of monomethylamine, dimethylamine, triethylamine, propylamine, dipropylamine, tripropylamine, isopropylamine, diisopropylamine, triisopropylamine, n-butylamine, dibutylamine, tributylamine, sec-butylamine, isobutylamine, t-butylamine, methylethylamine, dimethylethylamine, methyldiethylamine, methyl-n-propylamine, ethyl-n-propylamine, methylethyl-n-propylamine, ethylenediamine, diethylenetriamine (CAS #111-40-0), triethylenetetramine (CAS #112-24-3), tetraethylenepentamine (CAS #112-57-2), ethanolamine, diethanolamine, triethanolamine, propanolamine, dipropanolamine, tripropanolamine, isopropanolamine, diisopropanolamine, triisopropanolamine, butanolamine, dibutanolamine, tributanolamine, isobutanolamine, dimethylethanolamine, diethyleneglycol amine (diglycolamine), triethyleneglycol amine, N-methyldiethanolamine, diethylethanolamine, N-ethyldiethanol-amine, N-(2-hydroxyethyl)ethylenediamine, N,N-bis-(2-aminoethyl)methylamine, N,N-bis-(3-aminopropyl)methylamine, aminoethylethanolamine (CAS #111-41-1), N,N,N',N'-tetraethyldiethylenetriamine (CAS #123-12-6), N,N'-bis-(3-aminopropyl)-1,3-propanediamine (CAS #4605-14-5), N,N-bis [3-(methylamino)propyl]methylamine (CAS #123-70-6), and combinations thereof.

In various aspects, the water soluble salt of glufosinate is derived by neutralizing glufosinate acid with a cation selected from the group consisting of Li$^+$, Na$^+$, K$^+$, NH$_4^+$, and a quaternary organic ammonium cation of Formula (II):

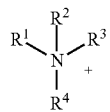

(II)

wherein R$^1$, R$^2$, R$^3$, and R$^4$ independently are linear or branched (C$_1$-C$_{16}$) alkyl, (C$_1$-C$_{16}$) arylalkyl, or (CH$_2$CH$_2$O)$_n$H, and n is an integer from 1-3.

The quaternary organic ammonium cation is not particularly limited. In various aspects, the quaternary organic ammonium cation is selected from the group consisting of tetramethyl ammonium cation, tetraethyl ammonium cation, tetrapropyl ammonium cation, tetrabutyl ammonium cation, trimethylethyl ammonium cation, dimethyldiethyl ammonium cation, methyltriethyl ammonium cation, N-benzyltrimethyl ammonium cation, N-hexadecyltrimethylammonium cation, choline cation, and combinations thereof.

II. SYNTHETIC AUXIN HERBICIDE SALTS

Exemplary synthetic auxin herbicides for use in the herbicide compositions of the present disclosure include, but are not limited to: pyridine-carboxylic acid herbicides such as aminopyralid, clopyralid, fluroxypyr, picloram, and triclopyr; phenoxy-carboxylic acid herbicides such as 4-CPA, 4-CPB, 4-CPP, 2,4-D, 2,4-DB, 3,4-DA, 3,4-DB, 3,4-DP, clomeprop, dichlorprop, fenoprop, MCPA, MCPB, mecoprop, and mecoprop-P; benzoic acid herbicides such as chloramben, dicamba, and TBA; and quinoline-carboxylic acids such as quinclorac and quinmerac.

In some aspects, the synthetic auxin herbicides for use in some of the herbicide compositions of the present disclosure may include 2,4-D, aminopyralid, clopyralid, dicamba, fluroxypyr, MCPA, MCPB, mecoprop, mecoprop-P, triclopyr, or combinations thereof. In another aspect, the synthetic auxin herbicide for use in the disclosed herbicide compositions may be 2,4-D or dicamba.

Salts of the synthetic auxin herbicides may be prepared by neutralizing the carboxylic acid form of the synthetic auxin herbicide with a base. For example, neutralizing 2,4-D carboxylic acid with dimethylamine would provide 2,4-D dimethyl ammonium salt.

In some aspects, the water soluble salt of the synthetic auxin herbicide is derived by neutralizing the synthetic auxin herbicide acid with an organic amine compound of Formula (I):

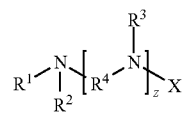

(I)

wherein:

R$^1$, R$^2$, and R$^3$ are each independently [(C$_n$H$_{2n}$)O]$_m$R$^5$;

R$^4$=[(C$_n$H$_{2n}$)O]$_m$R$^{5'}$;

R$^5$=H, OH or C$_1$-C$_6$ alkyl;

R$^{5'}$=(CH$_2$)$_n$;

X=R$^6$ or R$^7$NR$^8$R$^9$, where R$^6$, R$^8$, and R$^9$ are each independently [(C$_n$H$_{2n}$)O]$_m$R$^5$.

R$^7$=[(C$_n$H$_{2n}$)O]$_m$R$^{5'}$; and n=1-4; m=0-10; z=0-3.

The organic amine compound is not particularly limited. In various aspects, the organic amine compound is selected from the group consisting of monomethylamine, dimethylamine, triethylamine, propylamine, dipropylamine, tripropylamine, isopropylamine, diisopropylamine, triisopropylamine, n-butylamine, dibutylamine, tributylamine, sec-butylamine, isobutylamine, t-butylamine, methylethylamine, dimethylethylamine, methyldiethylamine, methyl-n-propylamine, ethyl-n-propylamine, methylethyl-n-propylamine, ethylenediamine, diethylenetriamine (CAS #111-40-0), triethylenetetramine (CAS #112-24-3), tetraethylenepentamine (CAS #112-57-2), ethanolamine, diethanolamine, triethanolamine, propanolamine, dipropanolamine, tripropanolamine, isopropanolamine, diisopropanolamine, triisopropanolamine, butanolamine, dibutanolamine, tributanolamine, isobutanolamine, dimethylethanolamine, diethyleneglycol amine (diglycolamine), triethyleneglycol amine, N-methyldiethanolamine, diethylethanolamine, N-ethyldiethanol-amine, N-(2-hydroxyethyl)ethylenediamine, N,N-bis-(2-aminoethyl)methylamine, N,N-bis-(3-aminopropyl)methylamine, aminoethylethanolamine (CAS #111-41-1), N,N,N',N'-tetraethyldiethylenetriamine (CAS #123-12-6), N,N'-bis-(3-aminopropyl)-1,3-propanediamine (CAS #4605-14-5), N,N-bis [3-(methylamino)propyl]methylamine (CAS #123-70-6), and combinations thereof.

In various aspects, the water soluble salt of the synthetic auxin herbicide is derived by neutralizing the synthetic auxin herbicide acid with a cation selected from the group consisting of $Li^+$, $Na^+$, $K^+$, $NH_4^+$, and a quaternary organic ammonium cation of Formula (II):

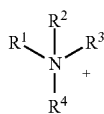
(II)

wherein $R^1$, $R^2$, $R^3$, and $R^4$ independently are linear or branched ($C_1$-$C_{16}$) alkyl, ($C_1$-$C_{16}$) arylalkyl, or ($CH_2CH_2O$). H, and n is an integer from 1-3.

The quaternary organic ammonium cation is not particularly limited. In various aspects, the quaternary organic ammonium cation is selected from the group consisting of tetramethyl ammonium cation, tetraethyl ammonium cation, tetrapropyl ammonium cation, tetrabutyl ammonium cation, trimethylethyl ammonium cation, dimethyldiethyl ammonium cation, methyltriethyl ammonium cation, N-benzyltrimethyl ammonium cation, N-hexadecyltrimethylammonium cation, choline cation, and combinations thereof.

III. SURFACTANTS

Suitable surfactants for use in the herbicide compositions of the present disclosure may be selected from the group including an anionic surfactant, a cationic surfactant, a nonionic surfactant, or mixtures thereof.

Exemplary anionic surfactants may include a fatty alkyl ether sulfate surfactant of Formula III:

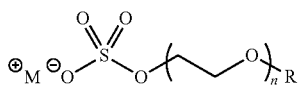
(III)

wherein: M is Na, K, $NH_4$, or alkyl ammonium, where the alkyl may selected from the group including methyl, ethyl, propyl, or isopropyl; n (the degree of ethoxylation) is from 1 to 10; and R is a saturated or unsaturated $C_6$-$C_{18}$ linear or branched alkyl group.

In some aspects, the anionic surfactant may be a lauryl ether sulfate of Formula III, where M is sodium or isopropyl ammonium, n is 1-3, and R is a saturated linear $C_{12}$ alkyl group. In some aspects, the anionic surfactant may be a sodium lauryl ether sulfate of Formula III where M is sodium, n is 1-3, and R is a saturated linear $C_{12}$ alkyl group. These exemplary surfactants are commercially available, for example, as STEOL® surfactants from Stepan Company (Northfield, Illinois, USA).

IV. VISCOSITY OF COMPOSITIONS

The viscosity of a liquid herbicide composition is an important physical property that impacts the usefulness of the liquid herbicide composition. The viscosity of a liquid herbicide composition is particularly important at low to moderate temperatures, such as, for example, temperatures of less than about −5° C., less than about 0° C., less than about 5° C., less than about 10° C., less than about 20° C., or less than about 25° C. This is important because liquids may become more viscous as they become colder. The viscosity of a liquid herbicide composition may impact pourability, dilution, mixing, spray solution formation, or spray solution stability. The viscosity of a particular liquid composition is typically dependent on the relative amounts and types of the ingredients in the composition, and the temperature at which the viscosity is measured.

An aqueous herbicide composition containing a high concentration of a water soluble herbicide salt, such as a salt of glufosinate, may have an unacceptably high viscosity, unless the aqueous herbicide composition also contains an organic solvent. However, the aqueous herbicide compositions of the present disclosure unexpectedly exhibit a level of viscosity that is less than would typically be expected. In particular, when comparing the viscosity of the disclosed aqueous herbicide compositions (containing a water soluble salt of glufosinate, a water soluble salt of a synthetic auxin herbicide, and a surfactant) to an aqueous herbicide composition containing only the glufosinate salt and the surfactant, a substantial reduction in viscosity (measured in centipoise (cP) at shear rate of 100 l/s) of the disclosed herbicide composition is observed. This reduction in viscosity, when measured at room temperature (e.g., 15° C. to 25° C.), can range from about 40% to about 90% reduction in viscosity. When measured at 0° C., this reduction in viscosity can range from about 50% to about 80% reduction.

V. HERBICIDAL COMPOSITIONS

A. Aqueous Concentrate Compositions

In some aspects, the aqueous liquid herbicide compositions of the present disclosure are aqueous herbicide concentrates that comprise, with respect to the total composition: (a) from about 1 to about 25 weight percent on an acid equivalent basis (wt % ae), of a water soluble salt of glufosinate; (b) from about 1 to about 25 wt % ae of a water soluble salt of a synthetic auxin herbicide; (c) from 1 to about 25 weight percent (wt %) of a surfactant; and, optionally, one or more additional inert ingredients. Upon dilution in water, the aqueous concentrates of the present disclosure form stable, homogeneous spray mixtures that may be readily used in spray applications to control plant growth.

In some aspects, the aqueous liquid herbicide composition of the present disclosure may be an aqueous herbicide concentrate that comprises: (a) from about 1 to about 25 wt % ae of an ammonium salt of glufosinate; (b) from about 1 to about 25 wt % ae of an ammonium salt of a synthetic auxin herbicide; and (c) from about 1 to about 25 wt % of a surfactant. The ammonium salt of glufosinate and the ammonium salt of the synthetic auxin herbicide are independently derived by neutralizing the glufosinate acid or the synthetic auxin herbicide acid with:

(i) an organic amine compound of Formula (I)

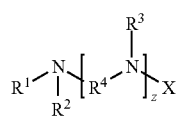
(I)

wherein:
$R^1$, $R^2$, and $R^3$ are each independently $[(CH_{2n})O]_m R^5$;
$R^4 = [(C_n H_{2n})O]_m R^{5'}$;
$R^5 =$ H, OH or $C_1$-$C_6$ alkyl;
$R^{5'} = (CH_2)_n$;

X=$R^6$ or $R^7NR^8R^9$, where $R^6$, $R^8$, and $R^9$ are each independently $[(C_nH_{2n})O]_mR^5$;

$R^7$=$[(C_nH_{2n})O]_mR^{5'}$; and n=1-4; m=0-10; z=0-3;

or:

(ii) a quaternary organic ammonium cation of Formula (II):

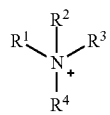

(II)

wherein $R^1$, $R^2$, $R^3$, and $R^4$ independently are linear or branched ($C_1$-$C_{16}$) alkyl, ($C_1$-$C_{16}$) arylalkyl, or $(CH_2CH_2O)_nH$, and n is an integer from 1-3.

This aqueous herbicide concentrate exhibits a reduction in viscosity between about 50% to about 80% at a temperature of about 0° C. when compared to a similar composition where the synthetic auxin herbicide salt is omitted.

In some aspects, the synthetic auxin herbicides for use in the aqueous herbicide concentrate of the present disclosure may comprise 2,4-D, aminopyralid, clopyralid, dicamba, fluroxypyr, MCPA, MCPB, mecoprop, mecoprop-P, triclopyr, or combinations thereof. In some aspects, the synthetic auxin herbicide for use in the aqueous herbicide concentrate may be 2,4-D, dicamba, or combinations thereof. In some aspects, the aqueous herbicide concentrate comprises the choline salt of 2,4-D. In some aspects, the aqueous herbicide concentrates comprises the choline salt of dicamba.

The aqueous herbicide concentrate of the present disclosure may include, on an ae basis, a weight ratio of the synthetic auxin herbicide salt to the glufosinate salt of from about 1:5 to about 5:1, from about 1:4 to about 4:1, from about 1:3 to about 3:1, from about 1:2 to about 2:1, from about 1:1.5 to about 1.5:1, from about 1:2.3 to about 2.3:1, from about 1:2.5 to about 2.5:1, from about 1:3.5 to 3.5:1, from about 1:1.5 to 1.5:1, from about 1:2 to 5:1, from about 1:1 to 4:1, from about 1:3 to 2:1, from about 1:5 to 3:1, from about 1:1.5 to 2.5:1, or from about 1:4.5 to about 4.5:1.

In some aspects, the surfactant in the aqueous herbicide concentrate of the present disclosure is an anionic surfactant. The anionic surfactant may be selected from various ether sulfates, such as a sodium lauryl ether sulfate or an isopropyl ammonium lauryl ether sulfate, or combinations thereof. The anionic surfactant may also be selected from a surfactant of Formula (III):

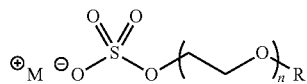

(III)

wherein: (a) M is Na, K, $NH_4$, or an alkyl ammonium selected from the group consisting of methyl, ethyl, propyl, and isopropyl ammonium; (b) n is an integer from 1 to 10; and (c) R is a saturated or unsaturated $C_6$-$C_{18}$ linear or branched alkyl group. In some aspects, M is Na or isopropyl ammonium, n is an integer from 1-3, and R is a saturated linear alkyl group (e.g., a Cu linear alkyl group).

B. Aqueous Herbicide Spray Mixtures

In another aspect, the aqueous liquid herbicide composition of the present disclosure is an aqueous herbicide spray mixture comprising a water soluble salt of glufosinate, a water soluble salt of a synthetic auxin herbicide, and a surfactant. The aqueous herbicide spray mixture may be prepared by diluting in water an aqueous herbicide concentrate of the present disclosure, or by tank mixing in water the components of the spray solution. Such a spray mixture may comprise, with respect to the total spray mixture, from about 0.1 to about 10 wt % each, from about 0.1 to about 7 wt % each, from about 0.1 to about 5 wt % each, from about 0.1 to about 3 wt % each, from about 0.5 to about 8 wt % each, from about 0.5 to about 5 wt % each, from about 1 to about 10 wt % each, from about 1 to about 8 wt % each, from about 1 to about 6 wt % each, from about 1 to about 5 wt % each, from about 1 to about 4 wt % each, from about 2 to about 7 wt % each, from about 2 to about 5 wt % each, from about 2.5 to about 8 wt % each, from about 3 to about 10 wt % each, or from about 4 to about 9 wt % each, of the water soluble salt of glufosinate, the water soluble salt of the synthetic auxin herbicide, and the surfactant.

VI. METHODS OF CONTROLLING PLANT GROWTH

Herbicidal activity is exhibited by the aqueous liquid herbicide compositions of the present disclosure when the aqueous liquid herbicide compositions are applied directly to the plant or to the locus of the plant at any stage of growth or before planting or emergence. The effect observed depends upon the plant species to be controlled, the stage of growth of the plant, the application parameters of dilution and spray drop size, the particle size of solid components, the environmental conditions at the time of use, the specific compound employed, the specific adjuvants and carriers employed, the soil type, and the like, as well as the amount of chemical applied. These and other factors can be adjusted as is known in the art to promote non-selective or selective herbicidal action.

Application rates of about 1 to about 2,000 grams per hectare (g/ha) are generally employed in both post-emergence and pre-emergence applications. The higher rates designated generally give non-selective control of a broad variety of undesirable vegetation. The lower rates typically give selective control and can be employed in the locus of crops.

Also described herein is a method of controlling undesirable vegetation by contacting the vegetation or the locus thereof with or applying to the soil to prevent emergence of the vegetation a herbicidally effective amount of the compositions of the present disclosure.

The aqueous liquid herbicide compositions of the present disclosure can additionally be employed to control undesirable vegetation in many crops that have been made tolerant to or resistant to them or to other herbicides by genetic manipulation or by mutation and selection. The compositions described herein can, further, be used in conjunction with glyphosate, glufosinate, dicamba, or imidazolinones on glyphosate-tolerant, glufosinate-tolerant, dicamba-tolerant, imidazolinone-tolerant, or 2,4-D-tolerant crops. The compositions described herein are preferably used in combination with herbicides that are selective for the crop being treated and complement the spectrum of weeds controlled by these compounds at the application rate employed. The compositions described herein are preferably applied at the same time as other complementary herbicides, either as a combination formulation or as a tank mix. Similarly the compositions described herein can be used in conjunction with acetolactate synthase inhibitors on acetolactate synthase inhibitor tolerant crops.

VI. USE WITH OTHER AGRICULTURAL ACTIVE INGREDIENTS

The aqueous liquid herbicide compositions of the present disclosure can also be used in combination with other agricultural active ingredients such as, for example, herbicides, insecticides, fungicides, plant growth regulators, safeners, various mixtures and combinations of these, and the like. These mixtures and combinations may be pre-mix concentrates or spray solutions prepared by either diluting such a concentrate or tank-mixing the components of the spray solution, or they may be applied sequentially with the other agricultural active ingredient or ingredients.

A. Herbicides

Herbicides that may be employed in conjunction with the aqueous liquid herbicide compositions of the present disclosure include, but are not limited to, 2,4-DEB, 2,4-DEP, 2,3,6-TBA, acetochlor, acifluorfen, aclonifen, alachlor, allidochlor, alloxydim, alorac, ametridione, ametryn, amibuzin, amicarbazone, amidosulfuron, aminocyclopyrachlor, aminopyralid, amiprofos-methyl, amitrole, ammonium sulfamate, anilofos, anisuron, asulam, atraton, atrazine, azafenidin, azimsulfuron, aziprotryne, barban, BCPC, beflubutamid, benazolin, bencarbazone, benfluralin, benfuresate, bensulfuron, bensulide, bentazone, benzadox, benzfendizone, benzipram, benzobicyclon, benzofenap, benzofluor, benzoylprop, benzthiazuron, bicyclopyrone, bifenox, bilanafos, bispyribac, borax, bromacil, bromobonil, bromobutide, bromofenoxim, bromoxynil, brompyrazon, butachlor, butafenacil, butamifos, butenachlor, buthidazole, buthiuron, butralin, butroxydim, buturon, butylate, cacodylic acid, cafenstrole, calcium chlorate, calcium cyanamide, cambendichlor, carbasulam, carbetamide, carboxazole chlorprocarb, carfentrazone, CDEA, CEPC, chlomethoxyfen, chloramben, chloranocryl, chlorazine, chlorbromuron, chlorbufam, chloreturon, chlorfenac, chlorfenprop, chlorflurazole, chlorflurenol, chloridazon, chlorimuron, chlomitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clomazone, cloproxydim, clopyralid, cloransulam, CMA, copper sulfate, CPMF, CPPC, credazine, cresol, cumyluron, cyanatryn, cyanazine, cycloate, cyclosulfamuron, cycloxydim, cycluron, cyperquat, cyprazine, cyprazole, cypromid, daimuron, dalapon, dazomet, delachlor, desmedipham, desmetryn, di-allate, dichlobenil, dichloralurea, dichlormate, diclosulam, diethamquat, diethatyl, difenopenten, difenoxuron, difenzoquat, diflufenican, diflufenzopyr, dimefuron, dimepiperate, dimethachlor, dimethametryn, dimethenamid, dimethenamid-P, dimexano, dimidazon, dinitramine, dinofenate, dinoprop, dinosam, dinoseb, dinoterb, diphenamid, dipropetryn, diquat, disul, dithiopyr, diuron, DMPA, DNOC, DSMA, EBEP, eglinazine, endothal, epronaz, EPTC, erbon, esprocarb, ethalfluralin, ethametsulfuron, ethidimuron, ethiolate, ethofumesate, ethoxyfen, ethoxysulfuron, etinofen, etnipromid, etobenzanid, EXD, fenasulam, fenoxasulfone, fenteracol, fentrazamide, fenuron, ferrous sulfate, flamprop, flamprop-M, flazasulfuron, florasulam, fluazolate, flucarbazone, flucetosulfuron, fluchloralin, flufenacet, flufenican, flufenpyr, flumetsulam, flumezin, flumiclorac, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, flurochloridone, flurtamone, fluthiacet, fomesafen, foramsulfuron, fosamine, furyloxyfen, halosafen, halosulfuron, haloxydine, haloxyfop, hexachloroacetone, hexaflurate, hexazinone, imazamethabenz, imazamox, imazapic, imazapyr, imazaquin, imazethapyr, imazosulfuron, indanofan, indaziflam, iodobonil, iodomethane, iodosulfuron, iofensulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, karbutilate, ketospiradox, lactofen, lenacil, linuron, MAA, MAMA, medinoterb, mefenacet, mefluidide, mesoprazine, mesosulfuron, mesotrione, metam, metamitron, metazachlor, metazosulfuron, metflurazon, methabenzthiazuron, methalpropalin, methazole, methiobencarb, methiozolin, methiuron, methometon, methoprotryne, methyl bromide, methyl isothiocyanate, methyldymron, metobenzuron, metobromuron, metolachlor, metosulam, metoxuron, metribuzin, metsulfuron, molinate, monalide, monisouron, monochloroacetic acid, monolinuron, monuron, morfamquat, MSMA, naproanilide, napropamide, naptalam, neburon, nicosulfuron, nipyraclofen, nitralin, nitrofen, nitrofluorfen, norflurazon, noruron, OCH, orbencarb, orthodichlorobenzene, orthosulfamuron, oryzalin, oxadiargyl, oxadiazon, oxapyrazon, oxasulfuron, oxaziclomefone, oxyfluorfen, parafluron, paraquat, pebulate, pelargonic acid, pendimethalin, penoxsulam, pentachlorophenol, pentanochlor, pentoxazone, perfluidone, pethoxamid, phenisopham, phenmedipham, phenmedipham-ethyl, phenobenzuron, phenylmercury acetate, picolinafen, pinoxaden, piperophos, pretilachlor, primisulfuron, procyazine, prodiamine, profluazol, profluralin, profoxydim, proglinazine, prometon, prometryn, propachlor, propanil, propazine, propham, propisochlor, propoxycarbazone, propyrisulfuron, propyzamide, prosulfalin, prosulfocarb, prosulfuron, proxan, prynachlor, pydanon, pyraclonil, pyraflufen, pyrasulfotole, pyrazolynate, pyrazosulfuron, pyrazoxyfen, pyribenzoxim, pyributicarb, pyriclor, pyridafol, pyridate, pyriftalid, pyriminobac, pyrimisulfan, pyrithiobac, pyroxasulfone, pyroxsulam, quinclorac, quinmerac, quinoclamine, quinonamid, rhodethanil, rimsulfuron, saflufenacil, S-metolachlor, sebuthylazine, secbumeton, sethoxydim, siduron, simazine, simeton, simetryn, SMA, sulcotrione, sulfallate, sulfentrazone, sulfometuron, sulfosulfuron, sulglycapin, swep, TCA, tebutam, tebuthiuron, tefuryltrione, tembotrione, tepraloxydim, terbacil, terbucarb, terbuchlor, terbumeton, terbuthylazine, terbutryn, tetrafluron, thenylchlor, thiazafluron, thiazopyr, thidiazimin, thidiazuron, thiencarbazone-methyl, thifensulfuron, thiobencarb, tiocarbazil, tioclorim, topramezone, tralkoxydim, triafamone, tri-allate, triasulfuron, triaziflam, tribenuron, tricamba, tridiphane, trietazine, trifloxysulfuron, trifluralin, triflusulfuron, trifopsime, trihydroxytriazine, trimeuron, tripropindan, tritac, tritosulfuron, vemolate, xylachlor, and salt or ester derivatives thereof.

Additional examples of herbicide active ingredients useful in the herbicidal compositions described herein (and their salts and esters) include, for example, compounds disclosed in U.S. Pat. Nos. 7,314,849; 7,300,907; 7,786,044; and 7,642,220.

In some aspects, the herbicide is a compound of Formula (VI):

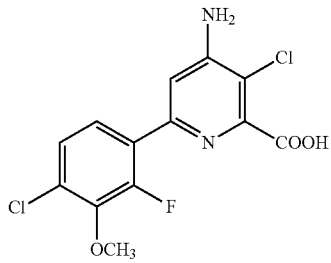

(VI)

also known as halauxifen, or a $C_1$-$C_6$ alkyl ester or salt thereof, e.g., the methyl ester, also known as halauxifen-methyl.

In some aspects, the herbicide is a compound of Formula (VII):

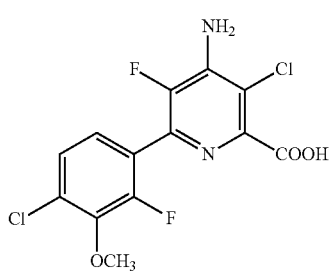

(VII)

also known as florpyrauxifen, or a $C_1$-$C_{12}$ alkyl or $C_7$-$C_{12}$ arylalkyl ester or salt thereof, e.g., the benzyl ester, also known as florpyrauxifen-benzyl.

In some aspects, the herbicide is a compound of Formula (VIII):

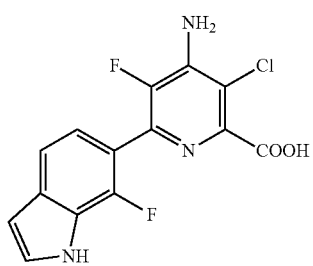

(VIII)

or a $C_1$-$C_{12}$ alkyl, a $C_7$-$C_{12}$ arylalkyl, a cyanomethyl, or a propargyl ester, or salt thereof.

In some aspects, herbicides that may be employed in conjunction with the aqueous liquid herbicide compositions of the present disclosure include one or more of acetochlor, aminocyclopyrachlor, atrazine, benfluralin, cloransulam, ethalfluralin, florasulam, florpyrauxifen, flumetsulam, halauxifen, isoxaben, metosulam, penoxsulam, propanil, propyzamide, pyroxsulam, tebuthiuron, thiazopyr, trifluralin, Formula (VIII), and salts or esters thereof.

B. Safeners

The aqueous liquid herbicide compositions of the present disclosure can generally be employed in combination with known herbicide safeners, such as benoxacor, benthiocarb, brassinolide, cloquintocet (mexyl), cyometrinil, daimuron, dichlormid, dicyclonon, dimepiperate, disulfoton, fenchlorazole-ethyl, fenclorim, flurazole, fluxofenim, furilazole, harpin proteins, isoxadifen-ethyl, mefenpyr-diethyl, MG 191, MON 4660, naphthalic anhydride (NA), oxabetrinil, R29148, and N-phenylsulfonylbenzoic acid amides, to enhance their selectivity. They can additionally be employed to control undesirable vegetation in many crops that have been made tolerant to or resistant to them or to other herbicides by genetic manipulation or by mutation and selection. For example, corn, wheat, rice, soybean, sugarbeet, cotton, canola, and other crops that have been made tolerant or resistant to the compositions described herein in sensitive plants can be treated. Some crops (e.g., cotton) have been made tolerant to auxinic herbicides such as 2,4-dichlorophenoxyacetic acid. The compositions described herein derived from auxin herbicides may be used to treat such resistant crops or other auxin herbicide tolerant crops.

VIII. ADJUVANTS, CARRIERS AND SURFACE-ACTIVE AGENTS

While it is possible to utilize the aqueous liquid herbicide compositions of the present disclosure directly as herbicides, it is preferable to use them in mixtures containing a herbicidally effective amount of the compositions described herein along with at least one agriculturally acceptable adjuvant or carrier. Suitable adjuvants or carriers should not be phytotoxic to valuable crops, particularly at the concentrations employed in applying the compositions for selective weed control in the presence of crops, and should not react chemically with the compositions described herein or other composition ingredients. Such mixtures can be designed for application directly to weeds or their locus or can be concentrates or formulations that are normally diluted with additional carriers and adjuvants before application.

Suitable agricultural adjuvants and carriers that are useful in preparing the compositions described herein are well known to those skilled in the art.

Liquid carriers that can be employed include water and organic solvents. The organic solvents typically used include, but are not limited to, petroleum fractions or hydrocarbons such as mineral oil, aromatic solvents, paraffinic oils, and the like; vegetable oils such as soy bean oil, rape seed oil, olive oil, castor oil, sunflower seed oil, coconut oil, corn oil, cotton seed oil, linseed oil, palm oil, peanut oil, safflower oil, sesame oil, tung oil, and the like; esters of the above vegetable oils; esters of monoalcohols or dihydric, trihydric, or other lower polyalcohols (4-6 hydroxy containing), such as 2-ethyl hexyl stearate, n-butyl oleate, isopropyl myristate, propylene glycol dioleate, di-octyl succinate, di-butyl adipate, di-octyl phthalate and the like; esters of mono, di and polycarboxylic acids, and the like. Specific organic solvents include toluene, xylene, petroleum naphtha, crop oil, acetone, methyl ethyl ketone, cyclohexanone, trichloroethylene, perchloroethylene, ethyl acetate, amyl acetate, butyl acetate, propylene glycol monomethyl ether and diethylene glycol monomethyl ether, methanol, ethanol, isopropanol, amyl alcohol, ethylene glycol, propylene glycol, glycerine, and the like. Water is generally the carrier of choice for the dilution of concentrates.

Surface-active agents (also known as surfactants) can be incorporated into the aqueous liquid herbicide compositions of the present disclosure. Such surface-active agents are advantageously employed in liquid compositions, especially those designed to be diluted with a carrier before application. The surface-active agents can be anionic, cationic, or nonionic in character and can be employed as emulsifying agents, wetting agents, suspending agents, or for other purposes. Surfactants conventionally used in the art of formulation and which may also be used in the compositions of the present disclosure are described, inter alia, in "McCutcheon's Detergents and Emulsifiers Annual", MC Publishing Corp., Ridgewood, New Jersey, 1998 and in "Encyclopedia of Surfactants", Vol. I-III, Chemical publishing Co., New York, 1980-81. Typical surface-active agents include salts of alkyl sulfates, such as diethanolammonium lauryl sulfate and sodium lauryl ether sulfates; alkylarylsulfonate salts, such as calcium dodecylbenzenesulfonate; alkylphenol-alkylene oxide addition products, such as nonylphenol-C18 ethoxylate; alcohol-alkylene oxide addition products, such as tridecyl alcohol-C16 ethoxylate; soaps, such as sodium stearate; alkylnaphthalene-sulfonate salts, such as sodium dibutylnaphthalenesulfonate; dialkyl esters of sulfosuccinate salts, such as sodium di(2-ethylhexyl) sulfosuccinate; sorbitol esters, such as sorbitol oleate; quaternary amines, such as lauryl trimethylammonium chloride; ethoxylated amines, such as tallowamine ethoxylate; betaine surfactants, such as cocoamidopropyl betaine; polyethylene glycol esters of fatty acids, such as polyethylene glycol stearate; block copolymers of ethylene oxide and propylene oxide; salts of mono and dialkyl phosphate esters; vegetable or seed oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, particularly methyl esters.

Oftentimes, some of these materials, such as vegetable or seed oils and their esters, can be used interchangeably as an agricultural adjuvant, as a liquid carrier or as a surface active agent.

Adjuvants that can be used to reduce spray drift can be added to the aqueous liquid herbicide compositions of the present disclosure or used in spray solutions containing the aqueous liquid herbicide compositions of the present disclosure include, but are not limited to, microencapsulated oils, self-emulsifying esters, ethoxylated natural oils, amine and amine oxide surfactants, alkylbenzene sulfonate surfactants, latex-stabilized emulsions, naturally derived oils such as fatty acid alkyl esters, fatty acid amides, and triglyceride fatty acid esters, aromatic esters, paraffinic oils, petroleum derived oils, and mixtures thereof.

Other adjuvants commonly used in agricultural compositions include compatibilizing agents, antifoam agents, sequestering agents, neutralizing agents and buffers, corrosion inhibitors, dyes, odorants, spreading agents, penetration aids, sticking agents, dispersing agents, thickening agents, freezing point depressants, antimicrobial agents, and the like. The aqueous liquid herbicide compositions of the present disclosure may also contain other compatible components, for example, other herbicides, plant growth regulators, fungicides, insecticides, and the like and can be formulated with liquid fertilizers or solid, particulate fertilizer carriers such as ammonium nitrate, urea and the like.

The compositions of the present disclosure are typically diluted with an inert carrier, such as water, before application. The diluted compositions applied to weeds or the locus of weeds generally contain about 0.0001 to about 1 weight percent (wt %) of the active ingredient and preferably contain about 0.001 to about 0.05 wt %. The diluted compositions may contain from about 0.001 to about 1 wt %, from about 0.005 to about 0.75 wt %, from about 0.01 to about 0.6 wt %, from about 0.05 to about 0.5 wt %, from about 0.075 to about 0.5 wt %, from about 0.1 to about 1 wt %, from about 0.01 to about 0.1 wt %, from about 0.005 to about 0.05 wt %, or from about 0.0005 to about 0.01 wt %.

The compositions of the present disclosure can be applied to weeds or their locus by the use of conventional ground or aerial sprayers, by addition to irrigation water, and by other conventional means known to those skilled in the art.

IX. EXAMPLES

The following Examples are presented to illustrate various aspects of the compositions of the present disclosure and should not be construed as limitations to the claims.

Example 1. Preparation of Herbicide Concentrates

Samples of 2,4-D choline and dicamba choline concentrates were prepared by combining the ingredients in Table 1 in the weight ratios shown to provide a 45 wt % ae solution of dicamba choline in water and a 44.5 wt % ae solution of 2,4-D choline in water.

TABLE 1

Compositions of 2,4-D choline and dicamba choline aqueous concentrates

| Ingredients | Assay % | Dicamba Choline 45 wt % ae | 2,4-D choline 44.5 wt % ae |
|---|---|---|---|
| dicamba | 98.3 | 45.78 g | |
| 2,4-D | 100 | | 44.50 g |
| choline hydroxide | 45 | 52.51 g | 51.93 g |
| Water | 100 | 1.71 g | 3.57 g |

Samples of glufosinate DMA concentrates were prepared by reacting glufosinate acid with an aqueous dimethyl amine solution to provide both 40 wt % ae and 50 wt % ae solutions of glufosinate DMA.

TABLE 2

Compositions of glufosinate DMA concentrates

| Ingredients | Assay wt % | Glufosinate (wt % ae) 50 | Glufosinate (wt % ae) 40 |
|---|---|---|---|
| Glufosinate | 98.53 | 50.75 | 40.65 |
| Dimethylamine | 40 | 31.11 | 24.92 |
| Water | 100 | 18.14 | 34.43 |

Example 2. Preparation and Physical Testing of Aqueous Liquid Herbicidal Compositions Containing Glufosinate-DMA, and 24-D Choline or Dicamba Choline Glufosinate-DMA formulations containing a lauryl ether sulfate surfactant, either the sodium salt (e.g., STEOL CS-270 C) or the isopropyl ammonium salt, were prepared with and without 2,4-D choline or dicamba choline by mixing together the necessary ingredients to prepare the compositions shown in Table 3. The viscosity of each formulation was measured at room temperature (e.g., about 15° C. to about 25° C.) or 0° C., at a shear rate of 100 l/s, and the measured viscosity is given in Table 3 in centipoise (cP).

TABLE 3

Aqueous compositions containing glufosinate and, 2,4-D or dicamba, control samples, and associated physical test results

| Ingredients | GD27 | GD32 | GD33 | GD34 | GD35 | GD36 | GD37 | GD38 | GD39 | GD40 | GD41 |
|---|---|---|---|---|---|---|---|---|---|---|---|
| | | | | | (wt % concentration of ingredients) | | | | | | |
| glufosinate | 16.66 | 16.66 | 16.74 | 16.66 | 16.66 | 18.15 | 18.15 | 18.15 | 17.72 | 17.31 | 16.92 |
| dimethylamine | 4.15 | 4.15 | 4.16 | 4.15 | 4.15 | 4.52 | 4.52 | 4.52 | 4.41 | 4.31 | 4.21 |
| lauryl ether sulfate, isopropyl ammonium | 18.19 | 18.19 | 18.27 | | | 19.84 | 19.84 | 19.84 | 19.37 | 18.93 | 18.5 |
| lauryl ether sulfate, sodium[1] | | | | 18.19 | 18.19 | | | | | | |
| 2,4-D | 17.89 | | | | | | 19.52 | | | | |
| dicamba | | | 17.97 | | 14.59 | | | | 19.74 | 19.27 | 18.82 | 18.4 |
| choline hydroxide | 9.40 | | 9.44 | | 7.66 | 10.25 | | | 10.36 | 10.12 | 9.88 | 9.66 |
| Physical Properties | | | | | | | | | | | |
| Homogeneous | YES | YES | YES | YES | YES | YES | YES | Phase Separation | Phase Separation | Phase Separation | YES |
| Viscosity, cP @ Room Temp 100 l/s | 80 | 620 (control) | 79 | 936 (control) | 56 | 178 | 495 (control) | | | | 94 |
| Viscosity, cP @ 0° C. 100 l/s | 331 | 1377 (control) | 397 | 1210 (control) | 232 | 947 | 888 (control) | | | | 480 |

Upon examination of the viscosity data shown in Table 3 for test samples GD27, GD33, GD35, GD36 and GD41, and comparing the test samples to control samples GD32, GD34 and GD37, it can be seen that the test samples (containing glufosinate and either 2,4-D or dicamba) exhibited unexpected and dramatically lower viscosities, at room temperature or 0° C., than the corresponding control samples that contain glufosinate but no 2,4-D or dicamba. The viscosities of the 5 test samples measured were from 40-90% lower than the control samples in 9 of the 10 viscosity measurements that were made.

The present invention is not limited in scope by the aspects disclosed herein which are intended as illustrations of a few aspects of the invention and any aspects which are functionally equivalent are within the scope of this invention. Various modifications of the compositions and methods in addition to those shown and described herein will become apparent to those skilled in the art and are intended to fall within the scope of the appended claims. Further, while only certain representative combinations of the composition components and method steps disclosed herein are specifically discussed in the aspects above, other combinations of the composition components and method steps will become apparent to those skilled in the art and also are intended to fall within the scope of the appended claims. Thus a combination of components or steps may be explicitly mentioned herein; however, other combinations of components and steps are included, even though not explicitly stated. The term "comprising" and variations thereof as used herein is used synonymously with the term "including" and variations thereof and are open, non-limiting terms.

What is claimed is:

1. An aqueous herbicide composition comprising:
   (a) from about 1 to about 25 weight percent on an acid equivalent (wt % ae) basis of a water soluble salt of glufosinate;
   (b) from about 1 to about 25 wt % ae of a water soluble salt of a synthetic auxin herbicide selected from the group including 2,4-D; and
   (c) from about 1 to about 25 weight percent (wt %) of a surfactant selected from the group consisting of a sodium lauryl ether sulfate, an isopropyl ammonium lauryl ether sulfate, and combinations thereof,
   wherein the composition exhibits a reduction in viscosity between about 40% to about 90% at a temperature between 15° C. to 25° C. when compared to a similar composition where the synthetic auxin herbicide salt is omitted,
   wherein the composition includes, on an ae basis, a weight ratio of the synthetic auxin herbicide salt to the glufosinate salt of from 1:3 to 3:1,
   wherein the water soluble salt of the synthetic auxin herbicide is derived by neutralizing the synthetic auxin herbicide acid with a choline cation,
   wherein the composition has no phase separation at about 0° C., and
   wherein the water soluble salt of glufosinate is derived by neutralizing glufosinate acid with either
   (i) a cation selected from the group consisting of a quaternary organic ammonium cation of the formula

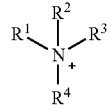

wherein $R^1$, $R^2$, $R^3$, and $R^4$ independently are linear or branched ($C_1$-$C_{16}$) alkyl, ($C_1$-$C_{16}$) arylalkyl, or $(CH_2CH_2O)_nH$, and n is an integer from 1-3; or
   (ii) an organic amine compound of the formula

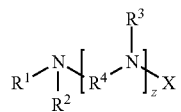

wherein:

$R^1$, $R^2$, and $R^3$ are each independently $[(C_nH_{2n})O]_mR^5$;

$R^4=[(C_nH_{2n})O]_mR^{5'}$;

$R^5$=H, OH or $C_1$-$C_6$ alkyl;

$R^{5'}=(CH_2)_n$;

X=$R^6$ or $R^7NR^8R^9$, where $R^6$, $R^8$, and $R^9$ are each independently $[(C_nH_{2n})O]_mR^5$;

$R^7=[(C_nH_{2n})O]_mR^5$; and n=1-4; m=0-10; z=0-3.

2. The composition of claim 1, wherein the water soluble salt of glufosinate is derived by neutralizing glufosinate acid with the organic amine compound of the formula

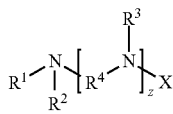

wherein:

$R^1$, $R^2$, and $R^3$ are each independently $[(C_nH_{2n})O]_mR^5$;

$R^4=[(C_nH_{2n})O]_mR^{5'}$;

$R^5$=H, OH or $C_1$-$C_6$ alkyl;

$R^{5'}=(CH_2)n$;

X=$R^6$ or $R^7NR^8R^9$, where $R^6$, $R^8$, and $R^9$ are each independently $[(C_nH_{2n})O]_mR^5$;

$R^7=[(C_nH_{2n})O]_mR^5$; and n=1-4; m=0-10; z=0-3.

3. The composition of claim 2, wherein the organic amine compound is selected from the group consisting of monomethylamine, dimethylamine, triethylamine, propylamine, dipropylamine, tripropylamine, isopropylamine, diisopropylamine, triisopropylamine, n-butylamine, dibutylamine, tributylamine, sec-butylamine, isobutylamine, t-butylamine, methylethylamine, dimethylethylamine, methyldiethylamine, methyl-n-propylamine, ethyl-n-propylamine, methylethyl-n-propylamine, ethylenediamine, diethylenetriamine (CAS #111-40-0), triethylenetetramine (CAS #112-24-3), tetraethylenepentamine (CAS #112-57-2), ethanolamine, diethanolamine, triethanolamine, propanolamine, dipropanolamine, tripropanolamine, isopropanolamine, diisopropanolamine, triisopropanolamine, butanolamine, dibutanolamine, tributanolamine, isobutanolamine, dimethylethanolamine, diethyleneglycol amine (diglycolamine), triethyleneglycol amine, N-methyldiethanolamine, diethylethanolamine, N-ethyldiethanolamine, N-(2-hydroxyethyl) ethylenediamine, N,N-bis-(2-aminoethyl) methylamine, N,N-bis-(3-aminopropyl) methylamine, aminoethylethanolamine (CAS #111-41-1), N,N,N',N'-tetraethyldiethylenetriamine (CAS #123-12-6), N,N'-bis-(3-aminopropyl)-1,3-propanediamine (CAS #4605-14-5), N,N-bis [3-(methylamino)propyl]methylamine (CAS #123-70-6), and combinations thereof.

4. The composition of claim 1, wherein the water soluble salt of glufosinate is derived by neutralizing glufosinate acid with the cation selected from the group consisting of a quaternary organic ammonium cation of the formula

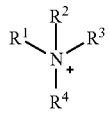

wherein $R^1$, $R^2$, $R^3$, and $R^4$ independently are linear or branched ($C_1$-$C_{16}$) alkyl, ($C_1$-$C_{16}$) arylalkyl, or $(CH_2CH_2O)_n$ H, and n is an integer from 1-3.

5. The composition of claim 4, wherein the quaternary organic ammonium cation is selected from the group including tetramethyl ammonium cation, tetraethyl ammonium cation, tetrapropyl ammonium cation, tetrabutyl ammonium cation, trimethylethyl ammonium cation, dimethyldiethyl ammonium cation, methyltriethyl ammonium cation, N-benzyltrimethyl ammonium cation, N-hexadecyltrimethylammonium cation, choline cation, and combinations thereof.

6. The composition of claim 1, wherein the surfactant is sodium lauryl ether sulfate of the formula

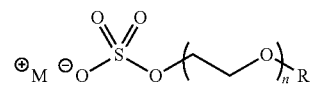

wherein:

M is Na;

n is an integer from 1 to 10; and

R is a saturated $C_{12}$ linear alkyl group.

7. The composition of claim 1, wherein the surfactant is isopropyl ammonium lauryl ether sulfate of the formula:

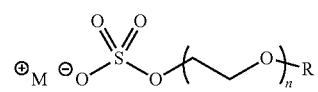

wherein M is isopropyl ammonium; n is an integer from 1 to 10; and R is a saturated $C_{12}$ linear alkyl group.

8. The composition of claim 1, further comprising one or more agriculturally acceptable adjuvants or carriers.

9. The composition of claim 1, wherein the aqueous herbicide composition is a aqueous liquid concentrate.

10. A method of preparing the aqueous herbicide composition of claim 1 comprising combining the water-soluble salt of glufosinate, the water-soluble salt of the synthetic auxin herbicide, the surfactant, and water.

11. A method of controlling undesirable vegetation comprising applying the aqueous herbicide composition of claim 1 to the undesirable vegetation or the locus of the undesirable vegetation after emergence of the undesirable vegetation, or to the soil to prevent the emergence of the undesirable vegetation.

* * * * *